(12) United States Patent
Chao et al.

(10) Patent No.: US 6,285,503 B1
(45) Date of Patent: *Sep. 4, 2001

(54) HOLOGRAPHIC DIFFUSER

(75) Inventors: Wei-Chung Chao; Chung-Jung Kuo; Ching-Yi Wu, all of Hsinchu (TW)

(73) Assignee: Industrial Technology Research Institute, Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,190

(22) Filed: Aug. 25, 1997

(51) Int. Cl.$^7$ .............................. G02B 5/18; G02B 27/44; G03H 1/04; G03F 9/00
(52) U.S. Cl. .............................. 359/569; 359/9; 359/565; 359/575; 430/1; 430/2; 430/4; 430/5
(58) Field of Search ................................ 359/9, 565, 567, 359/569, 572, 575; 430/1, 2, 4, 5

(56) References Cited

U.S. PATENT DOCUMENTS 3,619,022 * 11/1971 Hirsch et al. .............................. 359/9
5,218,471 * 6/1993 Swanson et al. ..................... 359/565

* cited by examiner

*Primary Examiner*—Audrey Chang
(74) *Attorney, Agent, or Firm*—Bacon & Thomas

(57) ABSTRACT

Method for the preparation of holographic diffusers where the holographic diffuser is designed through iterative calculations according to the Fraunhofer theory of diffraction and some constrain conditions. In the iterative calculation some constrain conditions that can change the magnitude of the light passing through the diffuser are used to design the diffuser. A novel iterative calculation is disclosed such that uniformed mixing of colors and high light utilization efficiency of the diffuser may be provided.

5 Claims, 5 Drawing Sheets

HOLOGRAPHIC DIFFUSER

FIELD OF THE INVENTION

The present invention relates to a method for the preparation of holographic diffusers and the holographic diffuser so prepared, especially to computer-generated design for holographic diffusers. The holographic diffuser of the invention provides high transmission rate and uniformed color-mixing effects.

BACKGROUND OF THE INVENTION

The holographic diffuser is an important element in the optical field. The holographic diffuser can not only improve the uniformity of the light projecting to an object but also widen the visibility of images. The applications of the holographic diffuser include: to function as background light source for planar display, as projection screen etc.

The conventional preparations of the holographic diffuser may be divided into two classes, as follows:

Planar diffusers: In this class, the ground glass is a good example. This kind of diffuser provides the scattering effect through the roughness of the surface of the diffuser. Due to the low transparent efficient of the diffuser, great attenuation of light passing through the diffuser is noted.

Holographic diffusers: In this glass, the shaping and diffusion of the light is provided through the interference of two light beams. Although the diffusion rate can be controlled and the light utilization efficiency of the diffuser may be enhanced, the energy after the diffuser is still reduced. As a result, unsatisfactory color mixing effects are noted.

It is thus a need in the industry to provide a method for the preparation of holographic diffusers that can enhance the transmission rate of the light beams and the color mixing effects through fine control of the structure of the diffusers. It is also a need in the industry to provide a method for the preparation of holographic diffusers so that holographic diffusers with high quality can be automatically designed and manufactured.

OBJECTIVES OF THE INVENTION

The purpose of this invention is to provide a novel method for the preparation of holographic diffusers with higher transparent rate and enhanced color mixing effects.

Another purpose of this invention is to provide a method for the preparation of holographic diffusers so that holographic diffusers with high quality can be automatically designed and manufactured.

Another purpose of this invention is to provide a method to design the structure of holographic diffusers with a computer.

Another purpose of this invention is to provide a novel structure of holographic diffusers.

Another purpose of this invention is to provide a holographic diffuser with higher light utilization efficiency and enhanced color mixing effects.

SUMMARY OF THE INVENTION

According to the present invention, a method for the preparation of holographic diffusers is disclosed. The holographic diffuser is designed through iterative calculations according to the Fraunhofer theory of diffraction and some constrain conditions. In the iterative calculation some constrain conditions that can change the magnitude of the light passing through the diffuser are used to design the diffuser. A novel iterative calculation is disclosed such that uniformed mixing of colors and high light utilization efficiency of the diffuser may be provided.

These and other objectives and advantages of this invention may be clearly understood from the detailed description by referring to the following drawings.

In the drawings

FIG. 3 shows a holographic diffuser with 32*32 units, as designed by a computer according to the method for the preparation of holographic diffusers of this invention.

DETAILED DESCRIPTION OF THE INVENTION

The following is a detailed description of the holographic diffuser an&the method for the preparation of holographic diffusers of this invention.

Figure 1:
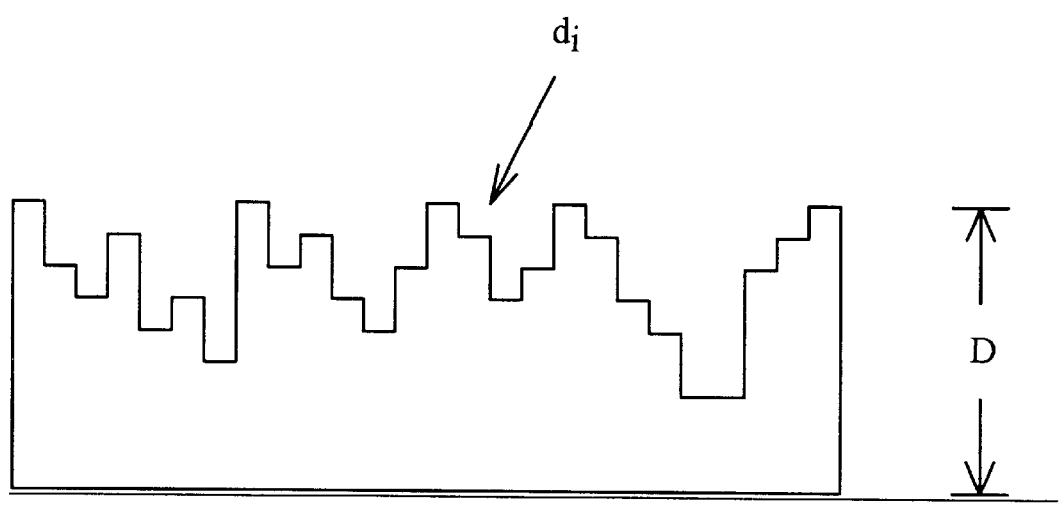
FIG. 1 illustrates the sectional view of the holographic diffuser of this invention.

FIG. 1 illustrates the sectional view of the holographic diffuser of this invention. As shown in the figure, the holographic diffuser of this invention is consisted of a number of units, distributed in a two-dimensional plan. The "units" are micro areas consisting the diffuser with the size of, for example. 1×1 $\mu$m. Also shown in this figure is that the thickness varies from unit to unit. In the embodiment of this invention. the holographic diffuser is prepared through chemical etching or laser beam etching. In this figure, D represents the thickness of the substrate of the diffuser, $d_i$ represent the depth of etching at the $i^{th}$ unit in a certain row of the diffuser.

According to this invention, the depth of etching di can be calculated from the following phase distribution function:

$$\phi = d_i \times k_j + (D - d_i) \times k_j \times n_j \quad (1)$$

wherein $\phi_j$ represents the phase distribution function of the diffuser in relating to the light source $\lambda_j$; $k_j$ represents the wave number under the light source $\lambda_j$; $n_j$ represents the index of refraction of the substrate; and j represents the number of light sources, j>1.

The method of this invention is applicable to light source with multiple wave lengths. The thickness of each unit can be determined according to the wave lengths of the light source, $\lambda_1, \lambda_2, \lambda_3, \ldots, \lambda_n$. In the general applications, however, light with three wave lengths, i.e., the three original colors, is most commonly used to give color mixing effects. The following description will be given under the premise of such light source.

Although it is not intended to limit the scope of this invention, it is found that the iterative operation may be employed to decide the spatial structure of the diffuser. With the help of a computer, the iterative operation may be conducted within a short time. These and other factors contribute to the method for the preparation of holographic diffusers and make it an advantageous approach over the conventional art.

Figure 2:
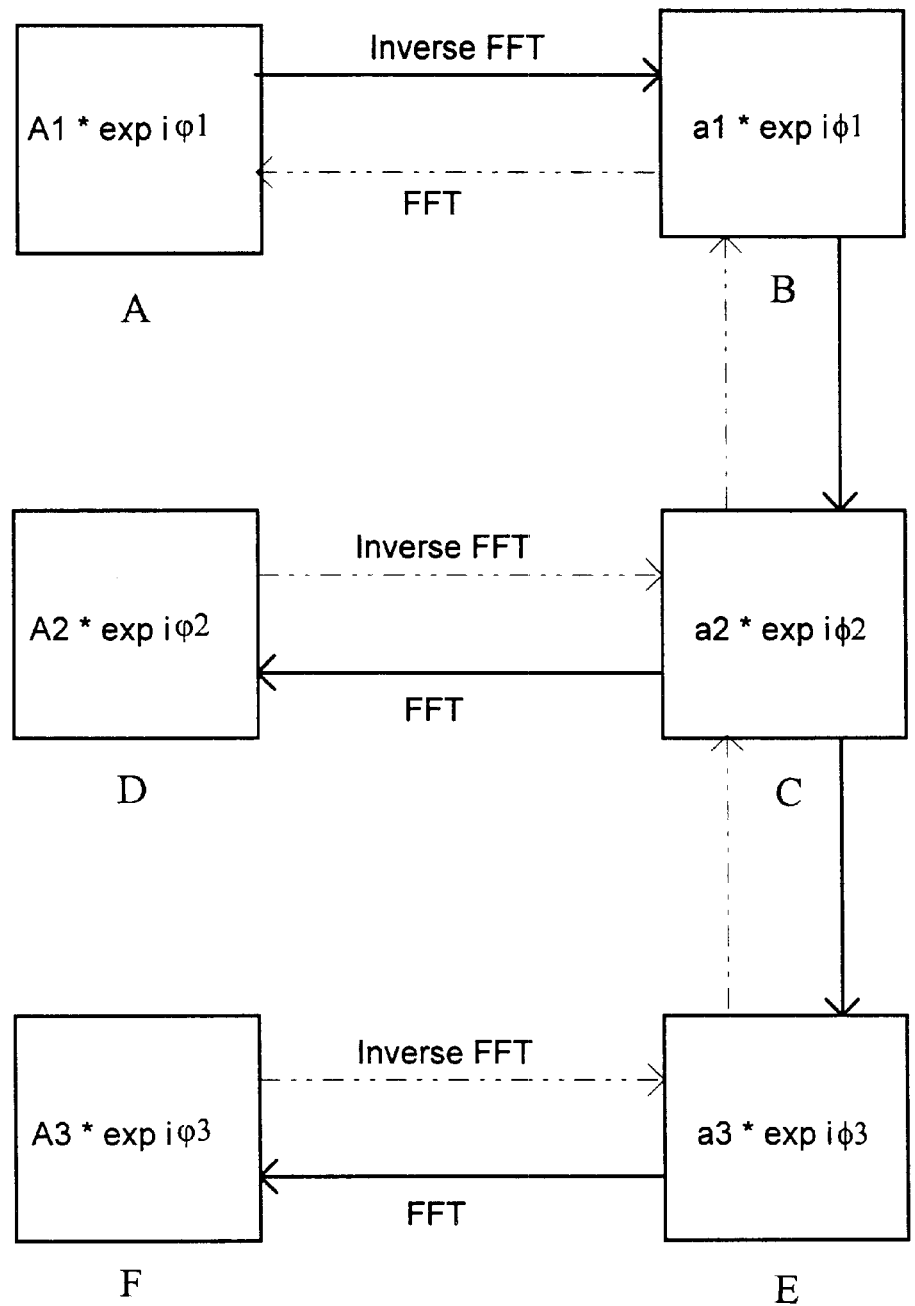
FIG. 2 shows the iterative operation applicable to this invention while three light sources are considered.

FIG. 2 shows the iterative operation applicable to this invention while three light sources $\lambda_1$, $\lambda_2$ and $\lambda_3$ are considered. As shown in this figure, at the beginning, initial phase amplitude values of the image are generated with a random number generator. This random number generator can be found in any of the conventional art. The initial values are in the form of a two-dimensional matrix, value representing the phase value of the far-field distribution function of the light having passed the diffuser. In this stage, the spatial amplitude ($a_1$) is considered a constant.

The iterative operation starts from the phase distribution $\Psi_1 = A1 * \exp(i\phi_1)$ in the spatial frequency domain The calculation is an inverse Fourier transformation of the phase distribution $\Psi_1$ in the spatial domain. The operation at this stage is conducted under the conditions of wave length $\lambda_1$ so that the result is the phase distribution $\phi_1$. In this stage, $a_1$ is considered a constant.

Then is the transformation of the phase distribution in the spatial domain for wave length $\lambda_2$. In this stage the phase transformation from wave length $\lambda_1$ to wave length $\lambda_2$ is carried out. That is, the thickness (or depth of etching) of each unit as calculated in the preceding stage is considered a basic parameter and the phase distribution $\phi_1$ is transformed to phase distribution $\phi_2$ of wave length $\lambda_2$. The phase distribution function (matrix) in this stage is embedded with the depths of etching and the phase difference of the non-etched areas.

In the next stage, use the Fourier transformation to transform the result of the preceding stage into the phase distribution function $\Psi_2$ in the spatial frequency domain under wave length $\lambda_2$. Here, the increase of magnitude (or amplitude) shall be examined such that $A_2'$ may satisfy the constrain conditions. If an element of $A_2'$ does not satisfy the constrain conditions, the magnitude variable shall be adjusted so that the light utilization efficiency of the related area may be maintained at a certain level.

After the adjustment under wave length $\lambda_2$, the phase distribution function $\Psi_2$ is transformed with phase distribution function $\phi_2$ in the spatial domain the inverse Fourier transformation to obtain a new under wave length $\lambda_2$. In this stage, the wave length $\lambda_2$ is considered a basic parameter and coefficients $a_1$ are considered a constant. phase. Then is the transformation from wave length $\lambda_2$ to $\lambda_3$. In this phase difference transformation, equation (1) is used and the depths of etching are considered basic parameters. The spatial phase distribution function $\phi_2$ under wave length $\lambda_3$ is transformed with the Fourier transformation to obtain phase distribution function $\Psi_3$ in the spatial frequency domain. The result is examined and adjusted so that the constrain conditions under magnitude $A_3'$ may be satisfied.

After the adjustment, the phase distribution is transformed with the inverse Fourier transformation to obtain a new spatial domain phase distribution $\phi_3$ under wave length $\lambda_3$. Transformations and examinations of the constrain conditions are conducted in sequence from $\lambda_3$ to $\lambda_2$ and then to $\lambda_1$. Finally the frequency spatial domain of the optical phase distribution under wave length $\lambda_1$ is obtained. The series of operation can be called an iterative operation loop.

After the loop the result is examined with all the constrain conditions. The Magnitudes $A_1'$, $A_2'$ and $A_3'$ are examined in sequence. If all the conditions are satisfied, it means the diffuser so prepared may provide all the required characters in the mixing of the three colors. If any of the conditions is not satisfied, the iterative operation shall be conducted for an additional loops until all conditions under magnitudes $A_j'$ are satisfied.

At the final stage, the depths of etching of the substrate is quantified. The depths are quantified into levels. For example, if the thickness of the is divided into two levels, the result of the quantization will be 0 and 1.

The diffuser so prepared inherents not only high light utilization efficiency but also conformed color mixing effects.

Figure 5:
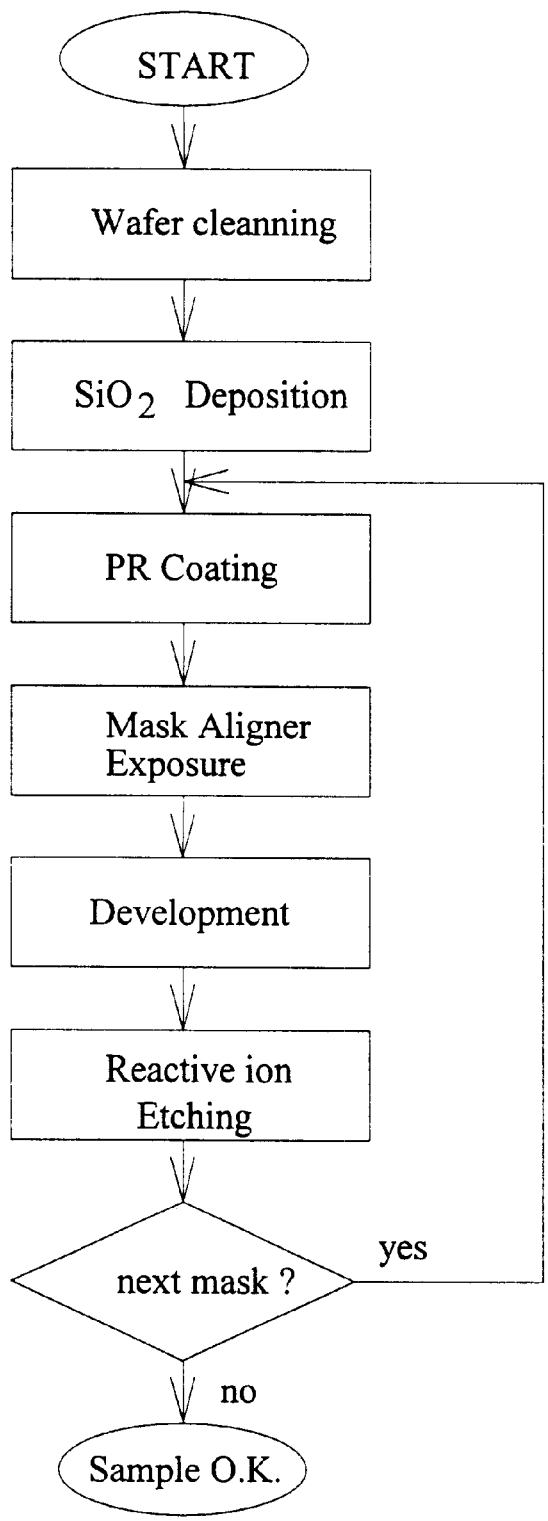
FIG. 5 illustrates the flow chart of the method for the preparation of holographic diffuser of this invention.

The following is a description of the method for the preparation of holographic diffusers of this invention. FIG. 5 illustrates the flow chart of the method for the preparation of holographic diffusers of this invention.

As shown in the figure, at 501 a substrate is prepared and polished. In general applications, the substrate may be a silicon wafer or a quartz substrate. At 502 an $SiO_2$ layer is deposited on the substrate to function as medium for the etching. If the substrate is used as the etching medium directly, this step may be omitted. At 503 masks with patterns prepared according to the above description are prepared. At 504 a photoresist layer is coated on the substrate as the exposure layer. At 505 the patterns are transformed to the photoresist layer. At 506 the $SiO_2$ layer or the substrate is etched. At 507, steps 503 to 506 are repeated until all the patterns are transformed to the substrate. At 508 a holographic diffuser is obtained.

In the preparation of the masks, the levels of the diffuser shall be considered. From the above-said iterative operation, a two-dimensional matrix will be obtained where the elements of the matrix represent the depths of the units to be etched. In the quantification of the $d_1$ values, the quantified values may be expressed with a binary format determined by the number of masks (m) to be prepared. For example, if three masks are used the levels of the quantification can be $2^3 = 8$ levels. Under such circumstance, the depths of etching each stage $\Delta d_1$ will be:

$$\Delta d_1 = \frac{\hat{\lambda}}{2^{m=3} \times \Delta n}$$

wherein $\hat{\lambda}$ is the average value of $\lambda_1$, $\lambda_2$ and $_3$; $\Delta n$ is the difference between the fraction index of the substrate and the fraction index of the air, $\Delta n = n - 1$.

EMBODIMENT

Figure 3:
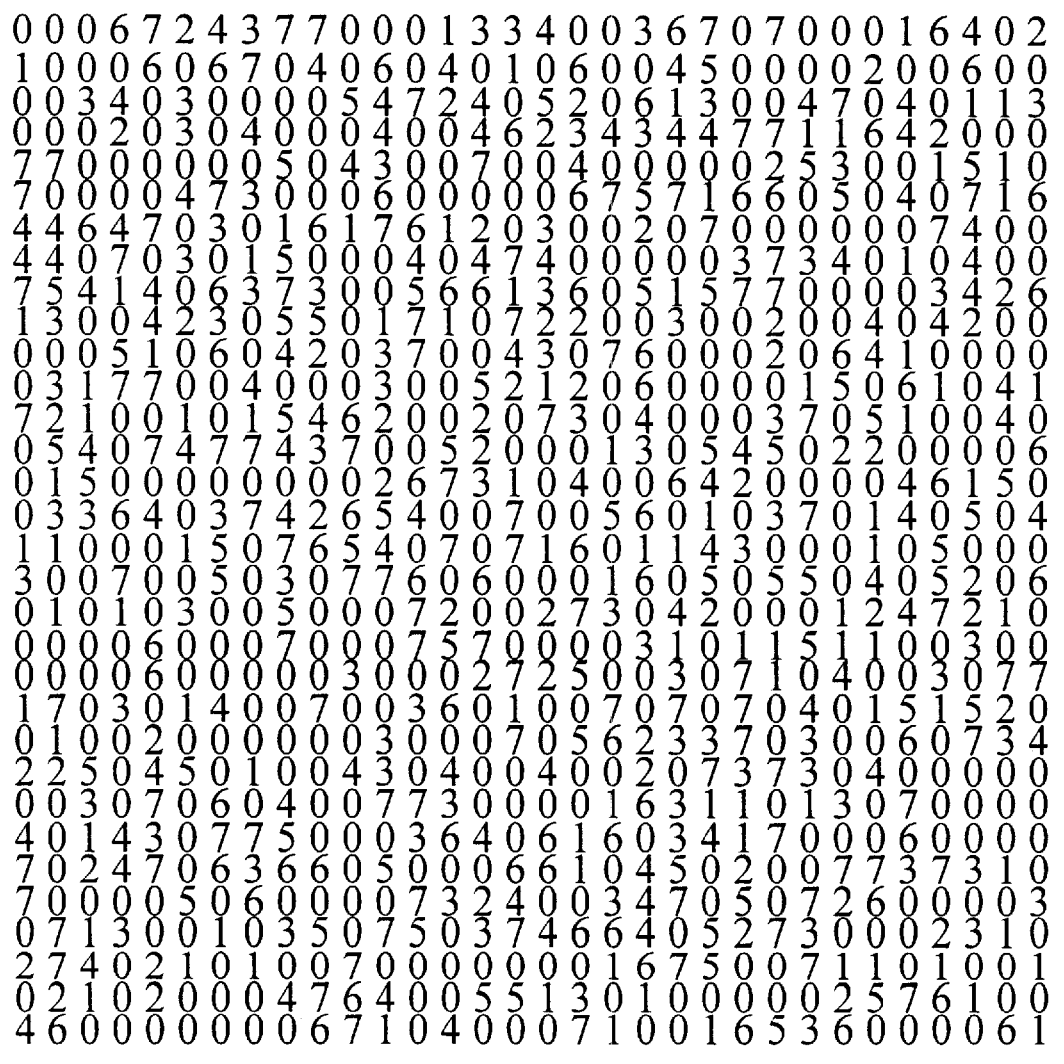

Two wave lengths are considered where $\lambda_1 = 0.565\,\mu m$ and $\lambda_2 = 0.650\,\mu m$. If the diffuser is consisted of 32*32 units and the thickness of the diffuser is divided into 8 levels, according to some restrain conditions the depth of etching of each unit may be obtained from the iterative operation. The result is shown in FIG. 3 wherein the numbers 0–7 represent the depths of the units in 8 levels. The normalized magnitudes of light passing through the diffuser are shown in FIG. 4.

EFFECTS OF THE INVENTION

Figure 4:
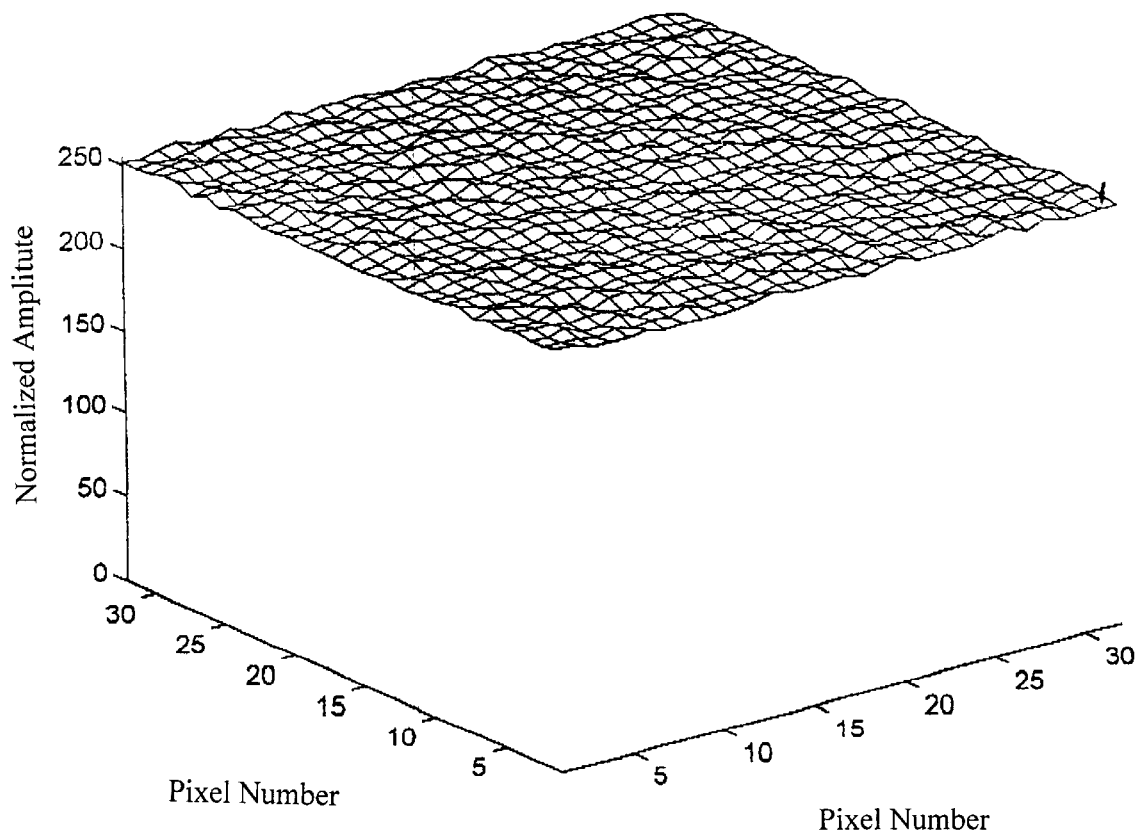
FIG. 4 illustrates the light utilization efficiency of all units in the holographic diffuser FIG. 3.

As shown in FIG. 4, the diffuser prepared from the present invention provides enhanced light utilization efficiency. Subjective tests reveals that, by using the holographic diffuser of this invention, the LED light source provides uniformed and soft colors.

Although the above description is based on the premise that three wave lengths are considered, it is obvious that the operation may be applicable to light source with multiple wave lengths. In the above description the initial values of the thickness of the units are generated by a random number generator. It is thus noted that the numbers shown in FIG. 3 are definitely not the only combination of this invention.

In the embodiment, the magnitudes are taken as major restrain conditions. In other applications other condition may also be considered independently or collectively. In addition to this, the spatial or planar distribution of the light source(s) can also be considered conditions in the transformation so to provide similar effects.

To be noted is that the above iterative operation can be calculated with a computer and the preparation can thus be conducted under a computer-aided manufacturing.

As the present invention has been shown and described with reference to a preferred embodiment thereof, those skilled in the art will recognize that the above and other changes may be made therein without departing from the scope and spirit of the invention.

What is claimed is:

1. A method for the preparation of holographic diffusers applicable to light source with multiple wave lengths, comprising the following steps:

preparing a substrate made of a plurality of units;

determining a thickness of the holographic diffuser, a unit area of said holographic diffuser, and sizes of said units;

calculating etching depths according to phase distribution matrices $\Phi_n$ of light having wavelengths $\lambda_n$ passing through said diffuser by:

(a) using a random number generator to generate initial etching depths $d_o$ and amplitude values A1 for optical field function $\Psi_1 = A1 * \exp(i\phi_1)$ in the spatial frequency domain;

(b) calculating a phase distribution matrix $\phi_1$ in the spatial frequency domain from the initial etching depths to obtain an optical field function $\Psi_1 = A1 * \exp(i\phi_1)$ in the spatial frequency domain;

(c) performing an inverse Fourier transform on optical field function $\Psi_1$ to obtain the optical field $a1 * \exp(i\Phi_1)$ and the phase distribution matrix $\Phi_1$ in the spatial domain for a first wavelength $\lambda_1$, to obtain adjusted etching depths;

(d) using the phase distribution matrix $\Phi_1$ and the adjusted etching depths, to calculate a new phase distribution matrix $\Phi_2$ at a second wavelength $\lambda_2$ in the spatial domain;

(e) obtaining a second optical field in the spatial domain $a1 * \exp(i\Phi_2)$, performing a Fourier transform on said second optical field to obtain an optical field function $\Psi_2 = A2 * \exp(i\phi_2)$ for wavelength $\lambda_2$ in the spatial frequency domain;

(f) adjusting amplitude coefficients A2 of optical field function $\Psi_2$ to permit a desired amplitude of light having wavelength $\lambda_2$ to pass through said diffuser and therefore provide a desired mixing effect, thereby obtaining an adjusted amplitude A2' and an amplitude adjusted optical field function $\Psi_2'$;

(g) performing an inverse Fourier transform of the amplitude-adjusted optical field function $\Psi_2'$ for wavelength $\lambda_2$ to obtain the optical field $a2 * \exp(i\Phi_2')$ and an adjusted phase distribution matrix $\Phi_2'$ in the spatial domain to obtain a new set of adjusted etching depths;

(h) using the phase distribution matrix $\Phi_2'$ and the new set of adjusted etching depths, to calculate a new phase distribution matrix $\Phi_3$ at a third wavelength $\lambda_3$ in the spatial domain;

(i) obtaining a third optical field in the spatial domain $a2 * \exp(i\Phi_3)$, performing a Fourier transform on said third optical field to obtain an optical field function $\Psi_3 = A3 * \exp(i\phi_3)$ for the wavelength $\lambda_3$ in the spatial frequency domain;

(j) adjusting amplitude coefficients of A3 of optical field function $\Psi_3$ to permit a desired amplitude of light having wavelength $\lambda_3$ to pass through said diffuser and therefore provide a desired mixing effect, thereby obtaining an adjusted amplitude A3' and an amplitude adjusted optical field function $\Psi_3'$;

(k) performing an inverse Fourier transform on amplitude-adjusted optical field function $\Psi_3'$ for wavelength $\lambda_3$ to obtain the optical field $a3 * \exp(i\Phi_3')$ in the spatial domain;

(l) repeating steps (h)–(k) for wavelengths $\lambda_4$ to $\lambda_n$ where n is the number of wavelengths to be diffused by said diffuser;

(m) repeating steps (h)–(k) for wavelengths $\lambda_n$ to $\lambda_1$ to form an iterative operation loop and obtain a set of final adjusted depths based on the final adjusted phase distribution matrix in the spatial domain;

determining patterns of masks according to the final adjusted depths $d_i$ so obtained; preparing masks according to patterns so determined; and etching said substrate with said masks.

2. The method according to claim 1 wherein the light source comprises three primary colors.

3. The method according to claim 1 wherein said holographic diffuser is divided into n*n units wherein n is an integer and the thickness of the units is divided into 8 levels.

4. The method according to claim 1 wherein the material of said holographic diffuser is selected from the group consisting of quartz, silicon and glass deposited with $SiO_2$.

5. The method according to claim 1, wherein $\phi_j = d_i \times k_j + (D - d_i) \times k_j \times n_j$, where D is a thickness of the substrate, $k_j$ is a wave number for wavelength $\lambda_j$, and $n_j$ is an index of refraction of said substrate.

* * * * *